A. M. SAUNDERS.
MARKING TUBULAR ARTICLES.
APPLICATION FILED OCT. 12, 1915.

1,274,788.

Patented Aug. 6, 1918.

WITNESSES

INVENTOR
A. M. Saunders

UNITED STATES PATENT OFFICE.

AUGUSTUS M. SAUNDERS, OF McKEESPORT, PENNSYLVANIA, ASSIGNOR TO NATIONAL TUBE COMPANY, OF PITTSBURGH, PENNSYLVANIA, A CORPORATION OF NEW JERSEY.

MARKING TUBULAR ARTICLES.

1,274,788.  Specification of Letters Patent.  Patented Aug. 6, 1918.

Application filed October 12, 1915. Serial No. 55,591.

*To all whom it may concern:*

Be it known that I, AUGUSTUS M. SAUNDERS, a citizen of the United States, and resident of McKeesport, in the county of Allegheny and State of Pennsylvania, have invented certain new and useful Improvements in Marking Tubular Articles, of which the following is a specification.

My invention relates to means for identifying welded pipes, tubes, and similar rolled metal products, has for its object the provision of a mark or symbol or series of marks or symbols on the surfaces of the pipes or other articles, which is always visible, apparently illegible or meaningless, but actually clear and plainly recognizable when observed in a certain manner or from the proper angle, and consists in the provision on the surfaces of the rolled metal articles of a series of disconnected and discontinuous projections or depressions forming marks having the appearance of defects but in reality forming a letter or series of letters or other symbols when examined at the proper angle.

In the manufacture of welded pipes and tubes it is frequently necessary, after the pipes or tubes have been shipped from the place of manufacture to a place of use, to determine where the pipe was made or at which of a number of plants such pipes were manufactured. It is also desirable to have these marks applied to the pipes or tubes so as to be hidden or not be readily seen or recognized, but at the same time to be clearly visible and clear when it is desired to determine absolutely the plant or company making such article. For example a pipe or tube after use for a considerable time may prove defective, the purchaser or user of the pipe seeks an adjustment, and a controversy arises as to the maker of the pipe or tube in question. When the applicant's mark is present on the article the company or plant of the company making the pipe can be readily determined.

Figure 1:
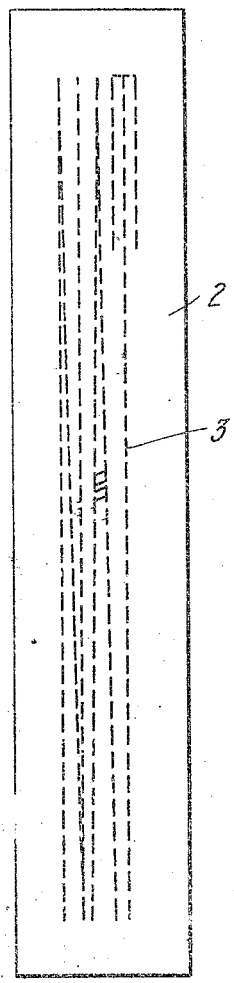

Referring now to the drawing forming part of this specification, Figure 1 is a plan showing a section of welded pipe having a mark as applied thereto in accordance with my invention.

Figure 2:
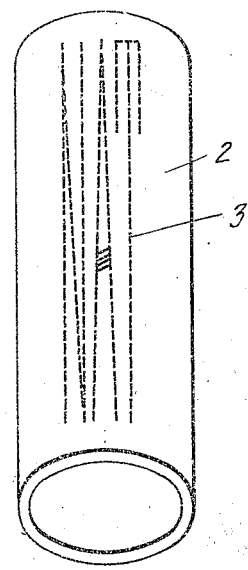

Fig. 2 is a perspective view showing the way in which a change in the angle of vision makes the mark more clearly apparent and more readily decipherable.

In the accompanying drawings, the outer surface of the pipe 2 is provided with a series of disconnected, or discontinuous marks 3, which, as shown, are arranged to form lines simulating the letters N A T (an abbreviation of "National"). When viewed from most directions and from nearly all angles, these marks do not clearly indicate that they form the letters N A T.

When occasion demands it can be readily determined whether or not any one pipe which is laid in the ground bears the applicant's mark, by uncovering a small part of the length of the buried pipe. Uncovering a small portion of the length reveals the presence or absence of the ridges or depressions on the pipe's surfaces. When these marks are present the relative location of but a few of them tells anyone familiar with the mark that it is one of the applicant's pipes, while the absence of the marks clearly indicates that the pipe is not of applicant's manufacture. That the pipe is one of applicant's is proved by uncovering sufficient of the length of the pipe to show the complete mark.

It is because the so-formed marks or interruptions in the smooth surface of the pipe are separated and discontinuous and of a length materially greater than their width, and because the series of marks are extremely long over all compared to the width thereof, that they are seemingly unrelated and meaningless. But being actually pre-arranged in a definite relative location, the marks do form legible symbols when viewed from the proper angle with respect to the surface of the pipe or tube.

When viewed from one end of the pipe at a slight angle to the axis of the pipe, as is illustrated in Fig. 2, the series of broken lines and perspective are shortened so that the length of the mark and of the letters formed by the marks is more nearly equal to the width thereof, and the lines merge one into another so as to show the letters N A T in a clear and unmistakable manner.

In applying the marks to the pipes or tubes, the surfaces of the welding rolls are erably are provided with depressions into which the metal of the pipes or tubes is rolled during the welding operation, and in this way raised projections are provided on the outer surface of the pipe, as is shown in Fig. 1.

As the circumference of the welding roll is considerably less than the length of the pipes and tubes as welded, the mark will be rolled on each pipe at two, three, or more places in the length of the pipe, so that the marks or part of the marks will appear on pieces of the pipes and tubes no matter how short the pieces into which they are cut.

The advantages of my invention arise from the provision of a mark which is not readily distinguishable but which when the significance of the mark is known is readily observed and clearly recognizable.

Modifications in the construction and arrangement of the mark and of the parts forming the mark may be made without departing from my invention. The letters forming the mark may be rolled in the surface of the pipe, instead of forming projections as shown, and other changes may be made within the scope of the appended claims.

I claim:—

1. As a new article of manufacture, a rolled metal product having a series of disconnected interruptions in the continuity of the otherwise smooth surface of the product, said interruptions seemingly being unrelated and meaningless but actually having a relative location arranged to form known and legible symbols when viewed from the proper angle relative to the marked surface.

2. As a new article of manufacture, a welded pipe or tube having a series of disconnected projections on the otherwise smooth outer surface of the pipe or tube, said projections seemingly being unrelated but actually having a relative location arranged to form a known and legible symbol, when viewed at the proper angle relative to the smooth surface of the pipe or tube.

In testimony whereof, I have hereunto set my hand.

AUGUSTUS M. SAUNDERS.